(No Model.) 3 Sheets—Sheet 1.

L. W. PRITZKOW.
MACHINE FOR BRONZING PAPER.

No. 531,643. Patented Jan. 1, 1895.

WITNESSES:

INVENTOR.
L. W. Pritzkow,
Per H. C. Gardiner,
ATTORNEY.

(No Model.) 3 Sheets—Sheet 2.
L. W. PRITZKOW.
MACHINE FOR BRONZING PAPER.
No. 531,643. Patented Jan. 1, 1895.
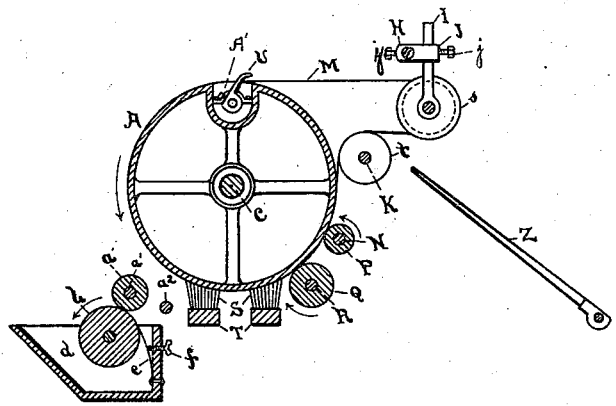
FIG. 4.
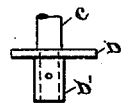
FIG. 6.
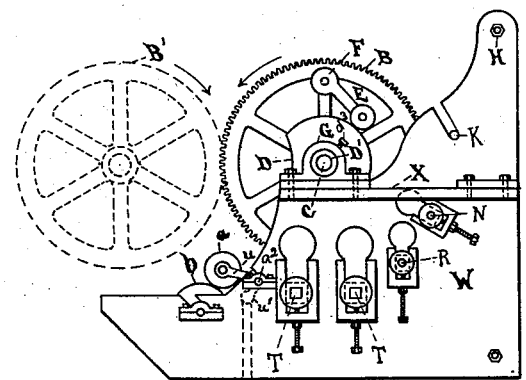
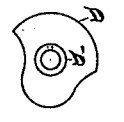
FIG. 7.
FIG. 5.
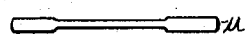
FIG. 10.
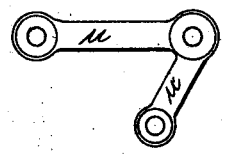
FIG. 11.
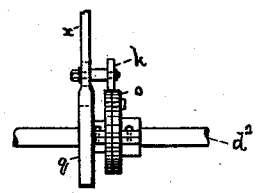
FIG. 9.
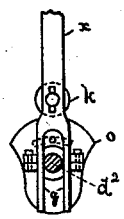
FIG. 8.
WITNESSES:
J. A. Blandel
J. W. Lohr
INVENTOR.
L. W. Pritzkow,
Per H. C. Gardiner,
ATTORNEY.

(No Model.) 3 Sheets—Sheet 3.

L. W. PRITZKOW.
MACHINE FOR BRONZING PAPER.

No. 531,643. Patented Jan. 1, 1895.

WITNESSES:

INVENTOR
Louis W. Pritzkow,
Per H. C. Gardiner,
ATTORNEY.

UNITED STATES PATENT OFFICE.

LOUIS W. PRITZKOW, OF SIOUX CITY, IOWA, ASSIGNOR OF ONE-HALF TO WM. H. SAMMONS, OF SAME PLACE.

MACHINE FOR BRONZING PAPER.

SPECIFICATION forming part of Letters Patent No. 531,643, dated January 1, 1895.

Application filed October 16, 1893. Serial No. 488,326. (No model.)

*To all whom it may concern:*

Be it known that I, LOUIS W. PRITZKOW, a citizen of the United States, residing at Sioux City, in the county of Woodbury and State of Iowa, have invented certain new and useful Improvements in Machines for Bronzing Paper; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to devices for bronzing paper.

The objects of my invention are, first, to produce a bronzing machine which may be attached to, and operated in conjunction with a printing or lithographing press; second, to provide a means for rapidly and effectively applying bronze to printed paper; and, third, to save the employment of unnecessary hands and economize power.

It is well known that the machines now in use are operated independently of the printing press thus requiring the employment of extra help.

My invention is attached to the press, is operated by it and regulated automatically and requires no attention beyond that of the regular press attendant.

Reference is now had to the drawings, in which—

Figure 1:
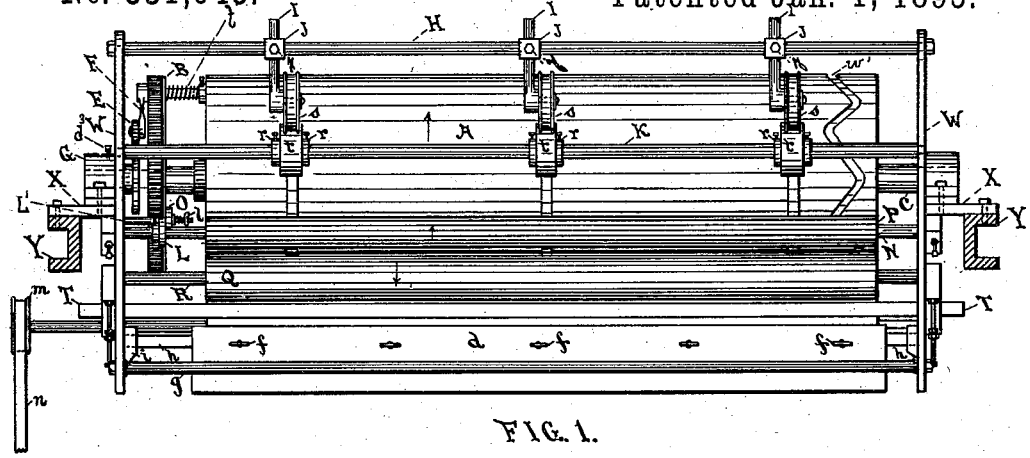
Figure 2:
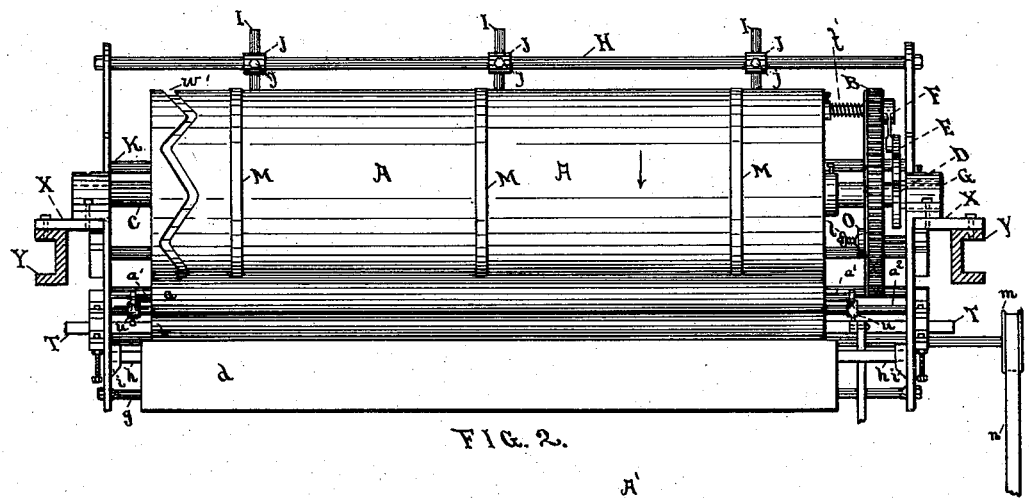
Figure 3:
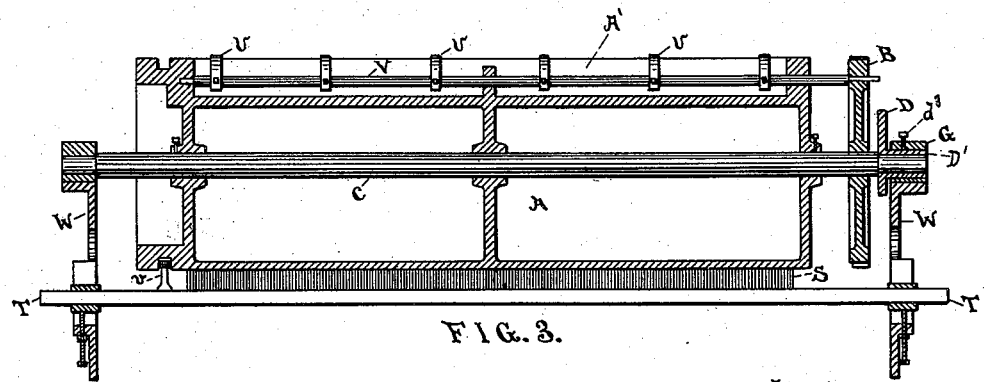
Figure 12:
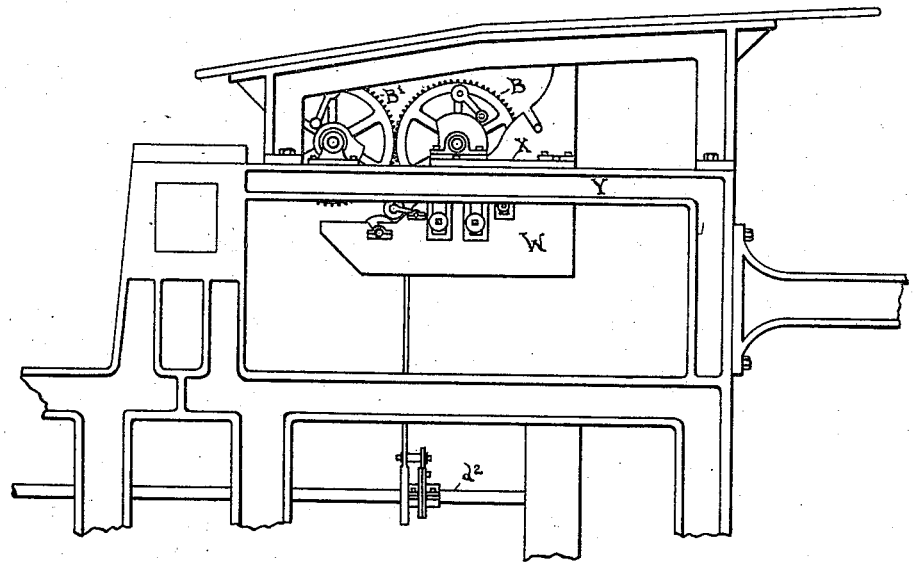
Figure 13:
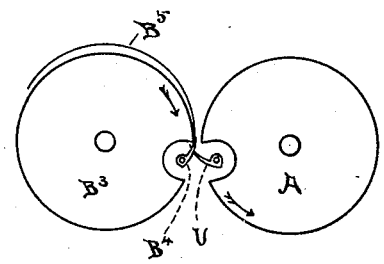
Figure 14:
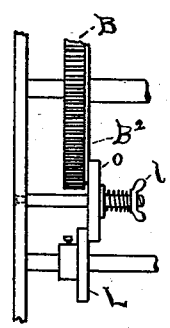
Figure 15:
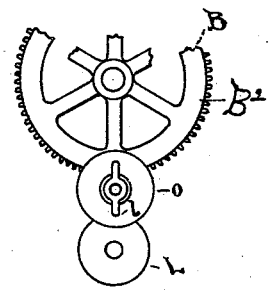

Figure 1. is a rear view of my invention, in side elevation. Fig. 2 is a front view of my invention, in side elevation. Fig. 3. is a longitudinal sectional view of a portion of the machine. Fig. 4 is a cross-sectional view. Fig. 5 is an end view, showing also the drive-wheel of the printing press and roller. Fig. 6 is a plan view of a stationary cam situated on the main shaft of the machine and Fig. 7 is an end view of the same. Fig. 8 is an end view of cam secured to the press shaft, showing, also, a portion of the roller piston. Fig. 9 is a side view of the same. Fig. 10 is a plan view of crank arm. Fig. 11 is a side view of same showing also arm on bronzing roller. Fig. 12 is a view in end elevation of combined press and bronzing machine. Fig. 13 is a cross-sectional view of the press roller and drum of the bronzing machine, showing the feed of the sheets. Fig. 14 is an enlarged detail view showing in rear elevation the means for operating the polishing roller. Fig. 15 is a side view of the same.

Similar letters of reference designate like parts throughout the several views.

A is a large hollow drum under which the paper is passed after delivery from the press roller.

B is a large cogged-wheel secured to the drum shaft C at the end of the drum, and meshes with the drive-wheel of the press, B'. Upon the inner side of the wheel B is a flange $B^2$ coincident with the cogs and useful for a purpose hereinafter described.

$B^3$ is the roller of the printing press and $B^4$ one of the grippers ordinarily in use upon the roller.

$B^5$ is the sheet ready for delivery to the bronzing machine.

D is a stationary cam, fitting the end of the shaft C and having a cylindrical projection D' fitting within the shaft-box G. The cam may be set at any position on the shaft by means of the thumbscrew $d^3$.

F is an arm secured to the end of a shaft V, which passes through the drum and the circumference of the wheel B, and bears the pulley E, adapted to trace the circumference of the cam D. The coiled spring $f'$ upon the shaft V holds the pulley E firmly to the cam.

D is a trough, or box, containing bronze and is of the same length as the drum, and situated at the front of the machine. The roller *b* is situated partly within said box, and made to revolve by the action of a pulley *m* situated at the end of the shaft of said roller, and a belt *n* connecting said pulley with a pulley upon the press shaft, Fig. 2. A spring blade *e* is situated in one side of said bronze box, and extending the length of the same serves to press the bronze against the roller *b* causing it to adhere thereto. The pressure of this spring can be regulated by means of the thumbscrews *f f f*. A second roller *a* is situated between the roller *b* and the drum, and is adapted to rest upon and turn by friction with the roller *b*, and at intervals to be thrown upward against the paper upon the drum by means presently described. At the rear of the roller $a$ is a shaft $a^2$ within boxes secured to the frame, and having arms $u\ u$ secured to each end of and embracing the shaft $a'$ of the roller $a$. Secured to one end of the shaft $a^2$ is a crank arm, $u'$, to which is pivotally attached a piston shaft $x$ operated by a cam $o$, secured to the press shaft $d^2$. A small wheel K is situated upon a shaft secured at right angles to the piston $x$, and rests upon said cam. The end of the piston is forked and embraces the press shaft. When the cam reaches the position shown in Fig. 8, the piston is raised, and communicating the motion to the crank arm $u'$, throws the roller $a$ against the paper, thus conveying the bronze from the roller in the bronze box to the paper. These rollers are covered with a substance, as fur, wool or felt, to which the bronze will lightly adhere. By having two rollers instead of one roller communicating directly with the paper, much of the bronze is saved and waste prevented.

S S and T T represent brushes situated underneath the drum, and movably set within the frame. The brushy part, preferably made of fur, is about of the length of the drum, and is adapted to distribute the bronze upon the paper. A stud $v$ is situated near the end of each of said brushes, and projects upwardly therefrom, entering a narrow irregular slot $w'$ encircling the end of the drum. As the drum turns the action of the studs within the slot moves the brushes back and forth longitudinally with the drum. The shaft V, before mentioned, is situated within a longitudinal groove $A'$, borne upon suitable bearings in the circumference of the drum. Grippers $u\ u\ u\ u$ are secured to said shaft and project slightly beyond the circumference of the drum. The action of the spring upon the shaft holds these grippers firmly to the paper upon the drum, and releases it when the roller E strikes the thick part of the cam D.

H is a shaft to which the pulleys $s\ s$ are connected by means of the standards I I I and the boxes J J J. These boxes have thumbscrews $j\ j\ j$, by tightening or loosening which, the standards I I I may be raised, or lowered or turned to any position upon the shaft H, thus regulating the distance of the pulleys from the drum, and tightening or loosening the tapes presently described.

K is a shaft upon which the pulleys $t\ t\ t$ revolve. The paper passes over these pulleys which assist in giving it direction and delivering it.

L is a friction wheel secured to the shaft N of the roller P, while O is a small friction wheel, connecting the wheel L with the flange of the wheel B, and revolving upon a shaft $L'$ secured within the frame. A thumbscrew and coil spring $l$ furnish means for regulating the speed of the roller P. By tightening the thumbscrew, the wheel O is pressed against the flange of the wheel B, and greater friction being produced, greater speed is communicated to the wheel L. It will be seen that the roller P turns in the same direction as the drum A, and is useful for brushing the surplus bronze and dust from the paper.

M M M are tapes passing over the drum and pulleys $s$ and $t$, and assist in directing and delivering the paper.

Q is a pulley turned by frictional contact with the drum and is useful for giving an upward direction to the paper after the paper passes underneath the drum.

R is the shaft of said roller set in boxes within the frame of the machine.

W, X and Y represent the framework of the machine, which is adapted to be set within the frame of the printing press at the rear end thereof, as shown in Figs. 5 and 12.

Z is one of several flies situated at the rear of the machine and operated by the printing-press.

$g$, $h$ and $i$ are portions of the machine frame.

The operation of my invention is as follows: Power from the press being applied to the machine, the drum is turned in the direction shown by the arrows, the press roller and the bronzing drum being in the relative positions shown in Fig. 13. The paper coming from the press roller passes downward between the roller and the drum, when its lower edge is released by the grippers of the press roller and seized and firmly held by the grippers of the drum $u\ u\ u$. As the paper passes underneath the drum the roller $a$ rises and presses against it, covering it with bronze. The brushes S S, by their longitudinal movements, distribute the bronze equally over the paper, which then passes upwardly between the rollers P and Q, and the drum and tapes. As the paper approaches the pulleys $t\ t\ t$, the grippers release their hold of the paper, which then passes over said pulleys, between said pulleys and the tapes, and is dropped upon the flies Z Z. The grippers may be made to grip the paper and release it at any desired position upon the drum by adjusting the stationary cam D to the drum shaft, the cam being set so that its thinnest part will be immediately opposite the place where it is desired to grip the paper, and the thickest part opposite the place for its releasement. The roller $a$, owing to the rapid revolution of the press shaft, rises and presses the paper often enough to furnish sufficient bronze, while the brushes S S equally distribute bronze over its whole surface.

Having described my invention, what I claim as new, and desire to secure by Letters Patent, is—

1. In a machine for bronzing paper, the combination with a printing or lithographing press, of a revolving drum having a longitudinal groove in which is situated a shaft bearing suitable grippers, a cogged-wheel near the end of the main shaft of said drum enmeshing with the drive wheel of the press, a flange upon the inner side of said wheel coincident with the cogs of said wheel, a trough or box containing bronze, and suitable means for applying said bronze to the paper and pressing it against the paper, distributing brushes situated underneath said drum and movably secured within the frame of the machine, said brushes being operated in a longitudinal direction by studs situated thereon and fitting an irregular groove which encircles one end of said drum, and a roller at the rear of the machine, adapted for polishing the paper and operated by means of a wheel borne upon a short shaft secured within the machine frame, said wheel being operated by friction with the flange upon said cogged wheel and operating by friction a pulley secured to the shaft of said polishing roller, and a coil spring and thumb screw on said shaft for regulating the pressure of said friction wheel, substantially as described.

2. In a machine for bronzing paper, the combination with a printing or lithographing press, of a revolving drum having a longitudinal groove, a shaft supported by suitable bearings in said groove, an arm secured to one end of said shaft and bearing a pulley adapted to pass over a stationary cam, grippers secured to said shaft, a cogged-wheel near the end of the main shaft of said drum enmeshing with the drive wheel of the printing press and having a flange upon the inner side thereof coincident with the cogs of said wheel, a box containing bronze, a roller operated by suitable means in said box, a spring plate in said box for pressing the bronze against said roller, thumbscrews for regulating the pressure of said plate, a movable roller resting upon said first roller and means for raising said movable roller and pressing it against the drum whereby bronze is conveyed to the paper, said rollers being covered with fur or other substance to which the bronze will tend to adhere, distributing brushes movably secured within the frame of the machine and operated in a longitudinal direction by studs situated upon said brushes and fitting an irregular groove in the end of said drum, a friction roller situated at the rear of the machine, turned by contact with the drum and adapted to give the paper an upward direction, a wheel at the rear of the machine borne upon a short shaft secured within the machine frame, said wheel being operated by friction with the flange upon said cogged-wheel and operating by friction another wheel secured to a roller adapted to clean the paper and brush the surplus bronze therefrom, substantially as described.

3. In a machine for bronzing paper, the combination with a printing or lithographing press, of a revolving drum having a longitudinal groove, a shaft supported by suitable bearings in said groove, an arm secured to one end of said shaft and bearing a pulley adapted to trace a stationary cam at the end of said drum, grippers secured to said shaft, a cogged-wheel secured to the end of the main shaft of said drum and enmeshing with the drive wheel of the press, a friction roller situated at the rear of said machine turned by contact with said drum and adapted to give the paper an upward direction, a roller for cleaning and brushing the paper, tapes encircling the drum, pulleys over which said tapes pass situated at a convenient distance at the rear of said drum, thumbscrews for raising and lowering the standards of said pulleys to tighten or loosen the said tapes, said tapes and pulleys being adapted to deliver the paper after the bronze is applied, substantially as described.

In testimony whereof I affix my signature in presence of two witnesses.

LOUIS W. PRITZKOW.

Witnesses:
H. C. GARDINER,
A. M. FORMAN.